No. 690,590. Patented Jan. 7, 1902.
J. KUN.
ELASTIC CHAIN BRACELET.
(Application filed July 24, 1901.)
(No Model.)

Witnesses:
Carl Ruyz
Josef Lohre

Inventor:
Josef Kun,
by [signature]
Attorney.

UNITED STATES PATENT OFFICE.

JOSEF KUN, OF PFORZHEIM, GERMANY.

ELASTIC CHAIN BRACELET.

SPECIFICATION forming part of Letters Patent No. 690,590, dated January 7, 1902.

Application filed July 24, 1901. Serial No. 69,506. (No model.)

*To all whom it may concern:*

Be it known that I, JOSEF KUN, a subject of the Grand Duke of Baden, and a resident of 6 Rabenstrasse, Pforzheim, in the Grand Duchy of Baden, German Empire, have invented certain new and useful Improvements in Elastic Chain Bracelets, of which the following is an exact specification.

My invention relates to an elastic chain bracelet, and has for its purpose to provide a chain bracelet without any fastening device whatever.

The invention is represented in the accompanying drawings, in which—

Figure 1:
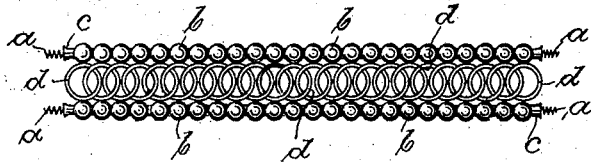
Figure 2:
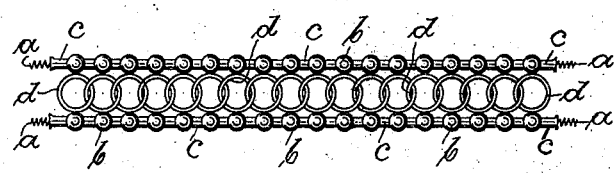
Figure 3:
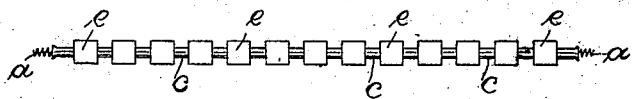
Figure 4:
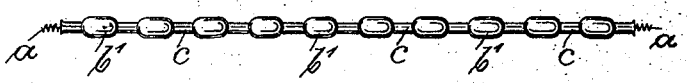
Figure 5:
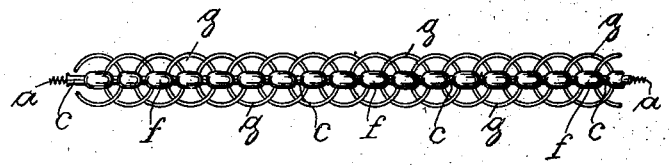
Figure 6:

Figure 1 shows part of the bracelet. Fig. 2 shows the same when lengthened, so as to be put over the hand. Figs. 3 and 4 are modifications of parts shown in Fig. 1. Fig. 5 is a modification of the entire bracelet. Fig. 6 shows detailed views of parts of the bracelet shown in Figs. 1 and 2.

The bracelet, Figs. 1 and 2, consists of two spiral springs $a\ a$, over which spiral springs small pipes $c$ are shifted, the ends of which pipes are bowed up, as may be seen from Fig. 6. Over the ends of two adjacent pipes $c$ hollow bodies, as balls $b$, Figs. 1, 2, and 6, cubes $e$, Fig. 3, or cylindrical bodies $b'$ or $f$, Figs. 4 and 5, are shifted. In the construction shown in Figs. 1 and 2 a chain is situated between the two spiral springs $a\ a$, the links $d$ of which chain are fixed to the balls $b$, so that between each ball of the upper spiral spring and the respective ball of the lower spiral spring one link of the chain is situated. In the construction shown in Fig. 5 only one spiral spring $a$ is situated in the middle of the bracelet. The links $g$ forming the chain are in this construction on one side fixed to one of the parts $f$. On the other side the links $g$ are divided and slide over one of the other parts $f$.

Having thus fully described the nature of my said invention, what I desire to secure by Letters Patent of the United States is—

1. In an elastic chain bracelet, the combination of a spiral spring, with small pipes $c$ situated around this spiral spring, hollow bodies shifted over the ends of two adjacent pipes $c$, and a chain, the links $d$ of which are fixed to the hollow bodies, substantially as set forth.

2. In an elastic chain bracelet, the combination of two spiral springs $a\ a$, with small pipes $c$ situated around these spiral springs, hollow bodies shifted over the ends of two adjacent pipes $c$, and a chain situated between the two spiral springs, each link $d$ of which chain is connected to one of the hollow bodies of each spiral spring, substantially as set forth.

In testimony whereof I have signed my name to this specification in the presence of two subscribing witnesses.

JOSEF KUN.

Witnesses:
 EMIL SCHÜTTERLE,
 FRIEDRICH BALDNER,